United States Patent [19]

Hastings

[11] E Patent Number: Re. 31,738

[45] Reissued Date of Patent: Nov. 20, 1984

[54] PORTABLE SINGLE BURNER CAMPSTOVE

[75] Inventor: Thomas C. Hastings, Willowdale, Canada

[73] Assignee: The Coleman Company, Inc., Wichita, Kans.

[21] Appl. No.: 59,437

[22] Filed: Jul. 20, 1979

Related U.S. Patent Documents

Reissue of:

[64] Patent No.: 4,126,117
Issued: Nov. 21, 1978
Appl. No.: 786,292
Filed: Apr. 11, 1977

[51] Int. Cl.[3] ..... F23D 13/04

[52] U.S. Cl. ..... 126/44; 126/245; 431/344

[58] Field of Search ..... 126/43, 44; 431/245, 431/248, 344; 137/604

[56] References Cited

U.S. PATENT DOCUMENTS

| | | | |
|---|---|---|---|
| 1,387,459 | 8/1921 | Bates | 431/245 X |
| 1,635,606 | 7/1927 | Chapman | 431/245 X |
| 2,246,080 | 6/1941 | Tullis | 126/44 |
| 3,574,505 | 4/1971 | Kimball | 126/44 X |
| 3,933,146 | 1/1976 | Hastings | 126/44 |

*Primary Examiner*—Alan Cohan

[57] ABSTRACT

The portable single burner campstove of this invention is characterized by compactness to conform to the space limitations of backpacking. The cooking unit assembly which can be mounted on top of a tank includes a reflector bowl, a burner within the reflector bowl and a grate. In addition, there is provided a burner box attached to the reflector bowl in communication with the burner. The burner box includes internal venturi means for carrying fuel from the tank into the burner box. In particular, there is provided a tube extending inwardly from the side of the burner box. The tube serves to entrain air with the fuel as the fuel is fed into the burner box. In addition, the burner box serves as a mixing chamber and distribution plenum for feeding a steady flow or an air/fuel mixture to the burner. The portable single burner campstove of the invention is characterized by high efficiency with minimum external dimensions.

1 Claim, 4 Drawing Figures

PORTABLE SINGLE BURNER CAMPSTOVE

Matter enclosed in heavy brackets [ ] appears in the original patent but forms no part of this reissue specification; matter printed in italics indicates the additions made by reissue.

BACKGROUND

The present invention relates to portable single burner campstoves and more particularly to portable single burner campstoves of the type useful for backpacking.

The developments of portable compstoves has closely paralleled the increased interest in outdoor activities such as picnicing, backpacking, and camping. Larger portable campstoves of the two burner type were developed having wind screens consisting of the upturned lid and outwardly folded side flaps. These stoves could be positioned so that the upturned lid was against the direction of the wind. Smaller portable campstoves of the single burner type are usually not provided with wind screens because it is not practical to do so. As a result, the development of portable campstoves of the latter type was impeded due to their failure to transfer heat as efficiently as desired, especially under cross-wind conditions.

I subsequently developed a portable single burner campstove characterized by wind resistance and high efficiency. It was specifically adapted to use with bottles of liquified propane or other similar gaseous fuels. The features of the campstove of my earlier invention are fully disclosed and described in U.S. Pat. No. 3,933,146. It was noted there that certain features could also be adapted for use with pressurized liquid fuel such as gasoline, naptha, kerosene or the like. While I successfully provided a portable single burner campstove of the type described, I noted a specific need for a portable single burner campstove for backpacking characterized by compactness in addition to wind resistance and high efficiency.

Because of the requirement of compactness for equipment used in backpacking, I sought to develop a pressurized liquid fuel burning campstove with minimum external dimensions. It was apparent that these rather demanding requirements dictated by the severe space limitations inherent in backpacking and the like were not satisfied by conventional stove assemblies. Although conventional campstoves could be modified to successfully employ the advantages of my earlier invention thereby providing a high degree of wind resistance and high efficiency, they were not sufficiently compact for the intended use particularly the portions thereof comprising the venturi assembly and the burner box assembly. It became apparent that at least these portions of conventional stove assemblies would have to be completely redesigned for backpacking and the like in order to satisfy these requirements in a suitable fashion. Accordingly, I sought to develop a combined venturi and burner box assembly that would successfully entrain air, mix air and fuel, trap unvaporized fuel, purge unvaporized fuel and distribute an air/fuel mixture to the burner of a backpacking campstove having minimum external dimensions to meet the requirement of compactness.

While the prior art has failed to overcome the problems associated with providing a portable single burner campstove for backpacking, the present invention provides a successful campstove design accomplishing the outlined objectives.

SUMMARY

The present invention is directed to a portable single burner campstove for backpacking. The campstove includes a cooking unit assembly having a reflector bowl, a burner within the reflector bowl, and a grate. It further includes a burner box attached to the reflector bowl in communication with the burner. The burner box includes internal venturi means for carrying fuel from an external source into the burner box. With these features, the internal venturi means serves to entrain air with the fuel as the fuel is fed into the burner box and the burner box serves as a mixing chamber and distribution plenum for feeding a steady flow of an air/fuel mixture to the burner.

In a preferred embodiment, the internal venturi means includes a tube extending inwardly from the side of the burner box having its axis perpendicular to the axes of the reflector bowl and the burner. The tube is of substantially uniform cross-section at every point along its length extending inwardly to a point beyond the axes of the reflector bowl and the burner and spaced intermediate the bottom of the burner box and the bottoms of the reflector bowl and the burner. The internal venturi means receives the fuel from the external source after its passes through generator means communicating with the tube.

The generator means includes a fuel line extending from the external fuel source to an open chamber adjacent the tube. The chamber is open to take in air for extrainment with the fuel as the fuel is fed into the burner box. The chamber is defined by a wind baffle into which the end of the fuel line remote from the external fuel source extends. The fuel line is supported by the wind baffle spaced from and in alignment with the tube.

The present invention is therefore directed to a portable single burner campstove characterized by compactness as well as wind resistance and high efficiency. It is an object of the present invention to provide a cooking unit assembly supported by and in communication with a burner box having internal venturi means for carrying fuel from an external source into the burner box. It will be appreciated from the description below that this object of the present invention is accomplished by utilizing a new concept in which the burner box and the internal venturi means serve multiple functions. The provision of the campstove and the realization of the advantages to be derived therefrom constitute additional important objects of the present invention as will be appreciated from the accompanying specification, claims and drawings.

DRAWINGS

The invention is described in conjunction with the accompanying drawings, in which.

DESCRIPTION

Figure 1:
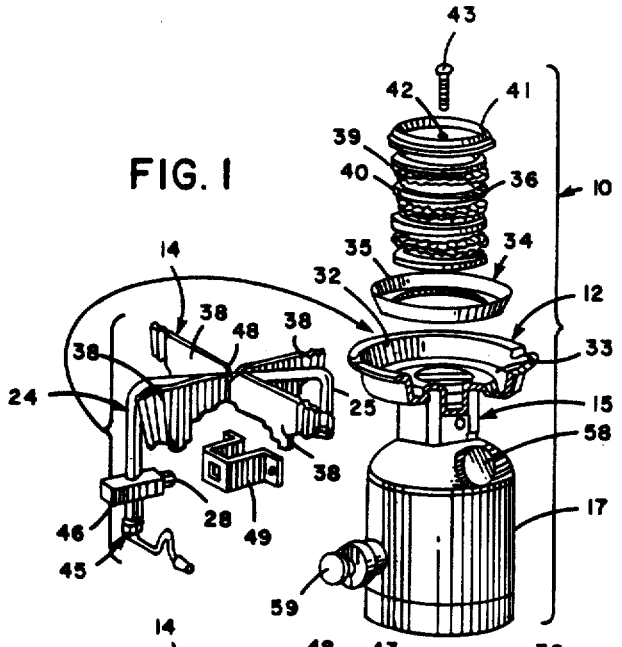
FIG. 1 is a partially cut away exploded perspective view of a portable single burner campstove in accordance with the present invention.
Figure 2:
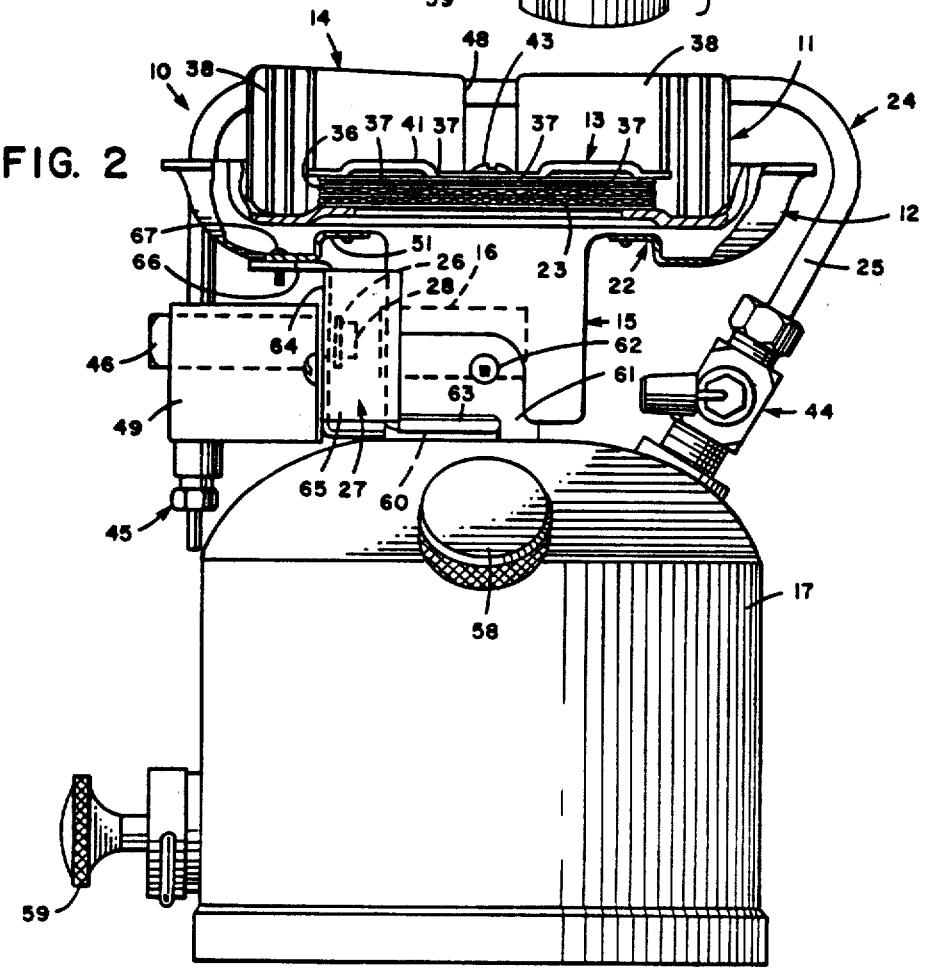
FIG. 2 is a partially cut away front elevational view of the campstove of FIG. 1.
Figure 3:
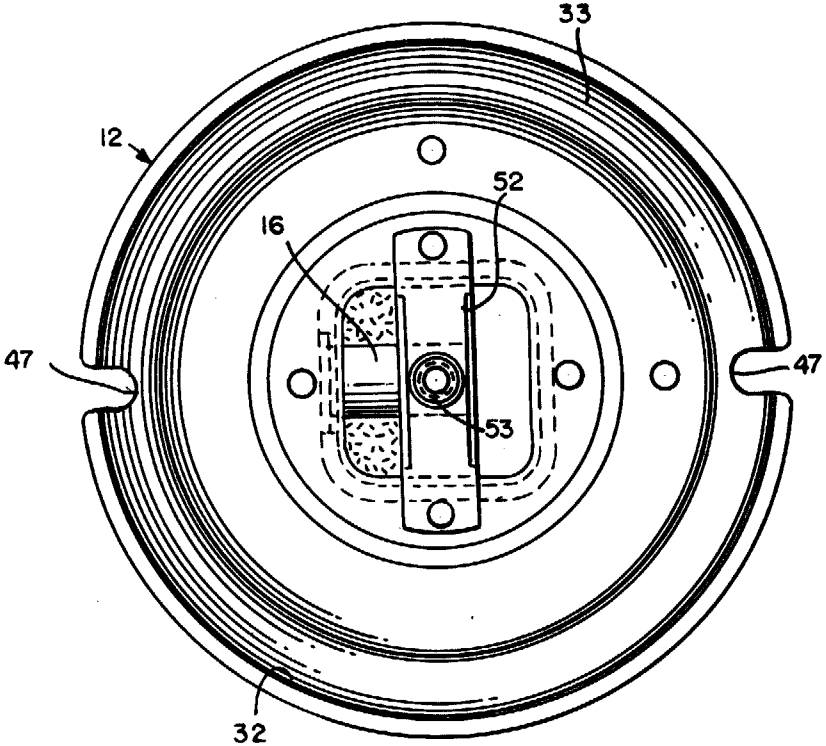
FIG. 3 is a plan view of a reflector bowl and a burner box of the campstove of FIG. 1.

In the illustration given and with reference first to FIG. 1, the numeral 10 designates generally a portable single burner campstove in accordance with the present invention. The campstove 10 includes a cooking unit assembly 11 (as shown in FIG. 2) having a reflector bowl 12, a burner 13 within the reflector bowl 12, and a grate 14. It further includes a burner box 15 attached to the reflector bowl 12 in communication with the burner 13. The burner box 15 includes internal venturi means 16 (as shown in FIG. 3) for carrying fuel from an external source 17 into the burner box 15. With these features, the internal venturi means 16 serves to entrain air with the fuel as the fuel is fed into the burner box 15 and the burner box 15 serves as a mixing chamber and distribution plenum for feeding a steady flow of an air/fuel mixture to the burner 13.

The internal venturi means 16 is a tube extending inwardly from the side 18 of the burner box 15 having its axis 19 perpendicular to the common axis 20 of the reflector bowl 12 and the burner 13. The tube 16 is of substantially uniform cross-section at every point along its length extending inwardly from the side 18 of the burner box 15 beyond the axis 20 of the reflector bowl 12 and the burner 13 and spaced intermediate the bottom 21 of the burner box 15 and the bottoms 22 and 23 respectively of the reflector bowl 12 and the burner 13. The internal venturi means 16 receives the fuel from the external source 17 after it passes through generator means 24 in indirect communication with the tube 16.

The generator means 24 includes a fuel line 25 extending from the external fuel source 17 to an open chamber 26 adjacent the tube 16. The chamber 26 is open to take in air for entrainment with the fuel as the fuel is fed into the burner box 15. The chamber 26 is defined by a wind baffle 27 into which the end 28 of the fuel line 25 remote from the external fuel source 17 extends. The fuel line 25 is supported by the wind baffle 27 spaced from and in alignment with the tube 16.

The external fuel source 17 is a tank of the fuel indirectly communicating with the internal venturi means 16 through the generator means 24. The generator means 24 vaporizes the fuel before the fuel is carried through the internal venturi means 16 into the burner box 15. The burner box 15 includes a sump 29 for trapping unvaporized fuel as the burner 13 is lighted and for purging unvaporized fuel after the burner 13 has been lighted. The reflector bowl 12 has an opening 30 in its bottom 22 mating with a corresponding open top 31 in the burner box 15 for communication of the burner box 15 with the burner 13.

Referring again to FIG. 1, the portable single burner campstove 10 can be better understood. The reflector bowl 12 is open-topped and has an upwardly curving outer wall portion 32. The inner surface 33 of the reflector bowl 12 is preferably made heat-reflective such as by polishing the surface thereof or providing a mirror-like finish by plating such as with nickel or chrome. The reflector bowl 12 serves not only to reflect heat upwardly toward a cooking utensil but also tends to limit radiation of heat downwardly below the cooking assembly 11. The portable single burner campstove 10 is also provided with a burner bowl 34. The burner bowl 34 is mounted within the reflector bowl 12 surrounding the burner 13. It is open-topped having an outer upwardly extending wall 35 located intermediately between the burner 13 and the wall portion 32 of the reflector bowl 12. The burner bowl 34 is particularly useful for purposes described in detail in my earlier U.S. Pat. No. 3,933,146.

The burner 13 provides a tubular side wall 36 in opposed relation to the upwardly extending wall 35 of the burner bowl 34. The side wall 36 of the burner 13 provides a multiplicity of flame ports 37 distributed therearound and arranged to direct the flame jets outwardly toward the upwardly extending wall 35 of the burner bowl 34 for impingement thereon. The burner 13 is designed so that the ports 37 in the side wall 36 direct jets of flame against the upwardly extending wall 35 of the burner bowl 34 which in turn deflects the flames upwardly.

The grate 14 includes four vertically oriented strips 38 of sheet metal extending outwardly from the central portion of the cooking unit assembly 11. It extends over the burner 13, the burner bowl 34, and the reflector bowl 12. The number of such grate strips 38 may vary from three to six although four strips are preferred. It will be appreciated that the upper edges of the strips 38 are in generally horizontal alignment to supportingly receive a cooking utensil without undue tilting. The lower portions of the strips 38 extend downwardly into the interior of the burner bowl 34 and the reflector bowl 12 to optimize the desired wind baffling effect of the strips 38 in the assembled grate 14.

Referring to FIG. 1, the individual components of the burner 13 can be understood. The tubular side wall 36 is formed from an assembly of rings comprising alternating corrugated rings 39 and flat rings 40. The corrugated rings 39 thereby provide a multiplicity of vertically and horizontally distributed gas ports 37 through which the flame jets emerge. The corrugated rings 39 and the flat rings 40 are relatively narrow in width meaning that they define a large cylindrical opening therethrough. The opening through the burner 13 is capped by a top burner plate 41 which is imperforate with the exception of a center hole 42 through which a bolt 43 extends. With this construction, the burner 13 initially directs the flame jets primarily outwardly but the upwardly extending wall 35 of the burner bowl 34 then deflects the flame jets upwardly toward the cooking surface.

The generator means 24 includes not only a fuel line 25 but also valves 44 and 45. The valve 44 is a shutoff valve attached to the tank 17 having three positions. It can be set in the off position to prevent fuel from flowing, the light position to permit fuel and air from the tank 17 to flow, or the run position in which primarily fuel is flowing. The fuel line 25 extends upwardly from the valve 44 across the cooking unit assembly 11 and downwardly to the valve 45. The valve 45 is a combination adjustment and cleaning valve. It can be moved back and forth to clean the generator tip 46 while providing infinitely variable positions to adjust the flame to the desired intensity. With these features, the generator 24 vaporizes the fuel flowing from the tank 17 before it reaches the burner box 15.

The reflector bowl 12 is preferably provided with cut-outs 47 at diammetrically opposite positions to receive the upwardly and downwardly extending portions of the fuel line 25. The fuel line 25 also passes through a notch 48 adjacent the intersection of the strips 38 in the grate 14. This feature helps to concentrate the heat of the flame from the burner 13 on the fuel line 25 to fully vaporize fuel flowing through the line particularly after the lighting or preheating stage. The fuel line 25 also cooperates with the cut-outs 47 and the notch 48 to hold the grate 14 firmly in position within the reflector bowl 12. With the generator tip 46 being supported in position within the wind baffle 27 by a generator bracket 49, the grate 14 cannot become dislodged or disoriented regardless of the handling of the campstove 10.

Figure 4:
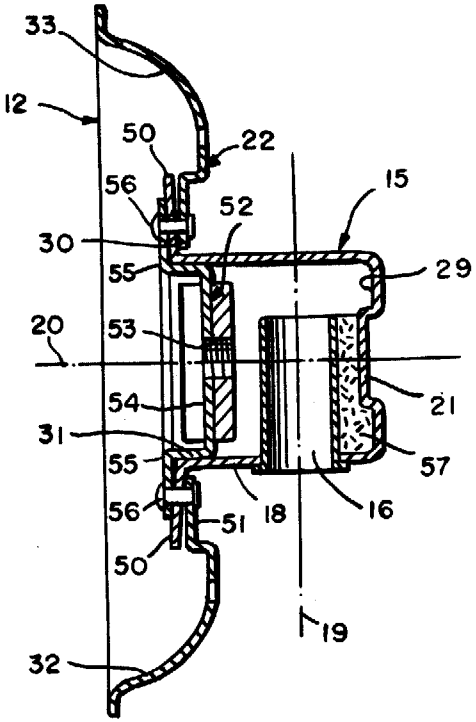
FIG. 4 is a cross-sectional view of a reflector bowl and a burner box of the campstove of FIG. 1.

Referring to FIGS. 3 and 4, the burner box 15 can be better understood. It is preferably square or rectangular in cross-section having outwardly extending flanges 50 attached to the upper extent of the sides such as 18. The flanges 50 can suitably be made integral with the sides of the burner box 15 overlapping a stepped-up portion 51 of the bottom 22 of the reflector bowl 12. A transverse strap 52 having a threaded center hole 53 extends transversely across the opening 31 in the top of the burner box 15. The strap 52 includes a recessed central portion 54 supported upon the flanges 50 by upwardly and outwardly extending flanges 55. The flanges 50 and 55 are then connected to the stepped-up portion 51 of the reflector bowl 12 with rivets 56. With these features, the burner box 15 is firmly attached to the reflector bowl 12.

The tube 16 extends inwardly from the side 18 of the burner box 15 below the strap 52 being at least partially surrounded by packing 57 to assure that the air and fuel entering the burner box 15 is not subject to premature condensation. The strap 52 is, of course, provided to receive the bolt 43 which attaches the burner 13 and the burner bowl 34 to the reflector bowl 12 and the burner box 15. When the bolt 43 has been threaded into the center threaded hole 53 in the strap 52, the burner 13, the burner bowl 34, the reflector bowl 12 and the burner box 15 are all held firmly in place in fixed relationship to one another.

Referring again to FIG. 2, the tank 17 will suitably include a filler cap 58 and a pump 59. The pump 59 pressurizes the tank 17 to assure a proper combination of fuel and air during lighting. It is necessary to supply air and fuel in this manner during the early stages of operation until the generator 24 is sufficiently heated to fully vaporize the fuel flowing through the fuel line 25. The tube 16 will then operate as a venturi to entrain air with vaporized fuel as the fuel is fed into the burner box 15. When the generator is fully operative, the burner box 15 serves as a mixing chamber and distribution plenum for feeding a steady flow of an air/fuel mixture to the burner 15 in a highly efficient manner.

The cooking unit assembly 11 can be attached to the tank 17 in a particularly advantageous manner. It can be fastened by means of spot welding a generally horizontal plate 60 to the top of the tank 17. The plate 60 has a pair of upstanding vertical members 61 to support the burner box 15 slightly above the tank 17 and the horizontal plate 60 (only one being shown). The burner box 15 makes limited contact with the upstanding members 61 by means of a pair of inwardly extending bosses provided to receive mounting screws 62 (only one being shown). The cooking unit assembly 11 can thereby be supported with the burner box 15 making only limited contact with the support at two spots.

The upstanding vertical members 61 are provided with slots 63 closely adjacent the horizontal plate 60 in position under the bosses and screws 62 to cause the heat from the burner box 15 to take a longer path in reaching the horizontal plate 60 and ultimately the two spot welds directly linking the plate 60 to the tank 17. The heat conduction path from the burner box 15 to the tank 17 is therefore severely limited by the structure. This is particularly important since the burner box 15 can become extremely hot in operation, being driven by exceptionally hot gas from the generator means 24 which reaches temperatures in the range of 500° to 900° F. The heat conducted to the tank 17 and to those items that must be handled and serviced such as the valves 44 and 45, the filler cap 58, and the pump 59 would otherwise be excessive. However, the structure provides a heat isolation means eliminating the heat conduction problem.

The wind baffle 27 is also advantageous consisting of an upstanding vertical member 64 integral with the horizontal plate 60 but separated from the upstanding vertical members 61 provided to support the burner box 15. The upstanding member 64 of the wind baffle 27 terminates in side or wing members 65 (only one being shown) perpendicular thereto and extending toward the burner box 15 to provide a three-sided structure that also serves as a guide for the orifice or generator tip 46. The upstanding member 64 also terminates in a flange 66 providing an outboard support for the cooking unit assembly 11 being attached by a screw 67 to the bottom 22 of the reflector bowl 12. The wind baffle shape in relation to the other operative components yields a balanced air pressure condition so that wind from any direction in a generally horizontal plane has little effect on the air fuel mixture or on combustion.

OPERATION

In operation, the campstove 10 is set up generally as illustrated in FIG. 2 with a cooking unit assembly 11 in generally horizontal alignment. In particular, the upper edges of the strips 38 of the grate 14 should be approximately horizontally aligned so that the grate 14 will supportingly receive a cooking utensil such as a skillet or pot without undue tilting. Once the campstove is properly set up, the valve 45 is moved back and forth to clean the generator tip 46 and the pump is used to pressurize the tank 17. A lighted match is then held at the burner 13 and the valve 44 is turned to the light position with the flame being allowed to burn until the yellow-orange flame is no longer visible and a short blue flame appears at which point the valve 44 is rotated to the run position. Once the campstove 10 has reached this condition, the preheating of the generator 24 will have been completed after which the flame can be adjusted to the desired intensity with the valve 45. In practice, the campstove 10 not only operates with high efficiency in still air conditions but maintains good efficiency even in cross-wind conditions which would ordinarily seriously interfere with the transfer of heat from the burner 13 to the cooking utensil.

The present invention therefore provides a portable single burner campstove characterized by compactness as well as wind resistance and high efficiency. It does this by providing a cooking unit assembly attached to and in communication with a burner box having internal venturi means for carrying fuel from an external source into the burner box. The burner box is supported above the external fuel source such as a tank by a bracket with associated heat isolation means. It is also provided with wind baffle means that provides a balanced air pressure condition so that wind from any direction in a generally horizontal plane has little effect on the air/fuel mixture. With these features of construction, the portable single burner campstove of the present invention is particularly well suited for back-packing and other outdoor activities involving severe space limitations.

While in the foregoing specification a detailed decription of the invention has been set forth for purposes of illustration, variations of the details herein given may be made by those skilled in the art without departing from the spirit and scope of the appended claims.

I claim:

1. A portable single burner campstove comprising a fuel tank, a burner assembly mounted above the fuel tank, a generator assembly communicating with the fuel tank and extending adjacent the burner assembly for vaporizing fuel, the generator assembly including a generator tip, a mounting member secured to the top of the fuel tank, a burner box supported by the mounting member, the burner box having a bottom wall and a perimetric side wall which provide an internal chamber, the burner assembly being mounted on the top of the burner box in communication with the internal chamber, a venturi tube extending through the side wall of the burner box into the internal chamber therein, the venturi tube being spaced upwardly from the bottom wall of the burner box, the generator tip being spaced outwardly from the venturi tube whereby fuel flowing through the generator tip mixes with air as the fuel enters the venturi tube, the air and fuel being mixed in said internal chamber and being distributed by the internal chamber to the burner assembly, *said mounting member including a horizontal base plate secured to the fuel tank and a pair of spaced-apart support members extending vertically upwardly from the base plate, the burner box being positioned between the support members, each of the support members having an inwardly extending boss for contacting the side wall of the burner box, and a screw extending through each of the bosses for securing the burner box to the support members.*

[2. The campstove of claim 1 in which the bottom wall of the burner box is spaced upwardly from the fuel tank.]

[3. The campstove of claim 1 in which the bottom wall of the burner box includes a raised central portion to provide a sump adjacent the side wall of the burner box.]

[4. The campstove of claim 1 in which the side wall of the burner box is generally rectangular in horizontal cross section.]

[5. The campstove of claim 1 in which the generator tip is supported by said mounting member.]

[6. The campstove of claim 1 in which said mounting member includes a horizontal base plate secured to the fuel tank and a pair of spaced-apart support members extending vertically upwardly from the base plate, the burner box being positioned between the support members, each of the support members having an inwardly extending boss for contacting the side wall of the burner box, and a screw extending through each of the bosses for securing the burner box to the support members.]

* * * * *